(12) United States Patent
Kitajima et al.

(10) Patent No.: US 6,503,967 B1
(45) Date of Patent: Jan. 7, 2003

(54) HARDENER FOR EPOXY RESIN AND EPOXY RESIN COMPOSITION

(75) Inventors: Takashi Kitajima, Tokushima (JP); Akihiro Nabeshima, Tokushima (JP)

(73) Assignee: Otsuka Nagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/868,325

(22) PCT Filed: Oct. 18, 2000

(86) PCT No.: PCT/JP00/07226
§ 371 (c)(1),
(2), (4) Date: Jun. 18, 2001

(87) PCT Pub. No.: WO01/29109
PCT Pub. Date: Apr. 26, 2001

(30) Foreign Application Priority Data

Oct. 19, 1999 (JP) .......................... 11-296872
Aug. 25, 2000 (JP) ....................... 2000-255272

(51) Int. Cl.$^7$ .............................. C08K 3/20; C08L 63/02
(52) U.S. Cl. ................................... 523/421; 528/90
(58) Field of Search ............................. 523/421; 528/90

(56) References Cited

U.S. PATENT DOCUMENTS 4,775,735 A * 10/1988 Goel ........................... 528/90
5,688,905 A    11/1997 Walker ....................... 528/332

FOREIGN PATENT DOCUMENTS

| EP | 0 994 142 A1 | 4/2000 |
|---|---|---|
| EP | 1 035 148 A1 | 9/2000 |
| EP | 1 138 711 A1 | 10/2001 |
| JP | 11-029695 A | 2/1999 |
| WO | 99/57171 A1 | 11/1999 |
| WO | 00/17252 A1 | 3/2000 |
| WO | 00/18818 A1 | 4/2000 |

OTHER PUBLICATIONS

Parent Abstracts of Japan, Publication No. 11–029695, Publication Date: Feb. 02, 1999.

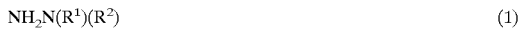

* cited by examiner

*Primary Examiner*—Robert Dawson
*Assistant Examiner*—D. Aylward
(74) *Attorney, Agent, or Firm*—Kubovcik & Kubovcik

(57) ABSTRACT

A curing agent for epoxy resins, the curing agent containing as an active ingredient a compound represented by the formula (1) or a salt thereof and an amine compound or a salt thereof, the curing agent being characterized in that at least one of the compound represented by the formula (1) and the amine compound is a salt of thiocyanic acid; and an epoxy resin composition having the curing agent incorporated therein:

$$NH_2N(R^1)(R^2) \qquad (1)$$

wherein $R^1$ and $R^2$ are the same or different and each represents alkyl having 1 to 8 carbon atoms, aryl, a nitrogen-containing heterocyclic group or when taken together, represents alkylene having 2 to 11 carbon atoms or a group represented by $—R^3—R^4—R^5—$ wherein $R^3$ and $R^5$ are the same or different and each represents alkylene having 1 to 8 carbon atoms, and $R^4$ is an oxygen atom, a sulfur atom or a group $=NR^6$ or $=NNH_2$, wherein $R^6$ is a hydrogen atom or alkyl having 1 to 8 carbon atoms.

7 Claims, No Drawings

HARDENER FOR EPOXY RESIN AND EPOXY RESIN COMPOSITION

This application is the National Stage in the U.S. of PCT/JP00/07226 filed Oct. 18, 2000.

TECHNICAL FIELD

The present invention relates to a curing agent for epoxy resin and epoxy resin composition.

BACKGROUND ART

Epoxy resin is widely used as sealing material, coating composition, adhesive, casting material, etc, in a variety of fields such as electricity, electronics, and civil engineering and construction, because a cured product of epoxy resin has excellent electrical insulating properties, moisture proof, heat resistance, soldering resistance, chemical resistance, durability, adhesive property, and mechanical strength. However, in case of mixing a filler to the epoxy resin, the mixture sometimes has a high viscosity which causes a problem depending on use. In these cases, an organic solvent is usually added to the mixture to reduce the viscosity.

Conventionally, the curing of epoxy resin is carried out by adding a curing agent to epoxy resin, followed by heating. As typical representative examples of curing agent, there are, for example, diethylenetriamine, triethylenetetramine, isophoronediamine, diaminodiphenylmethane, diaminodiphenylsulfone, polyamides, dicyandiamide, hexahydrophthalic anhydride, methyl nadic anhydride, novolac type phenol resin, tertiary amines, imidazoles, and amine complex of boron trifluoride.

Of these curing agents, ones which can cure epoxy resin at room temperature are amine curing agents such as diethylenetriamine, triethylenetetramine, polyamides, and tertiary amines. However, these curing agents require a long time of four to seven days for curing. It is difficult for other curing agents to be cured at room temperature, and they generally require a curing temperature of 80 to 200° C., and a curing time of 0.5 to 6 hours.

Meanwhile, an epoxy resin adhesive for outdoor construction is generally used in the field of civil engineering and construction. With a conventional curing agent, however, it is very difficult to cure epoxy resin without heating, as previously described. Even with one capable of curing, it takes an extremely long period of time, namely, four to seven days. Especially, for winter-season execution of works in which the outdoor temperature is often 10° C. and below, it is essential to initiate the curing reaction by heating.

Such characteristic of epoxy resin adhesive prolongs the period of execution of works in civil engineering and construction, which is also one of the causes of interfering with labor saving.

Further, most of conventional curing agents for epoxy resin have problems that curing ability decreases with the presence of water, a long time is required for curing, characteristics of cured product are greatly impaired, or cured product is not obtained. Therefore, in fact, use of curing agent is greatly limited in outdoor under rain or in shore-protection works.

As means for overcoming such problems, the present inventors proposed compounds represented by the formula (1), typically 1-aminopyrrolidine, as a curing agent for epoxy resins which agent can quickly cure an epoxy resin even at room temperature or at a low temperature without lowering the curability in the presence of water (Japanese Patent Application Nos. 137743/1998 and 285932/1998).

These compounds are excellent in curability in a low temperature range compared with conventional curing agents for epoxy resins. However, the cured epoxy resin is insufficient in water resistance immediately after curing, and takes a long time (aging for about 48 hours) until the cured product becomes satisfactory in water resistance. Consequently, there is a need for further reducing such aging period in order to shorten the term of construction works.

In recent years, a demand exists for materials which are safe and outstanding in resource-saving capability and in environmental conservation. There is a growing interest in using aqueous solvents in place of organic solvents for diluting purposes in view of control of volatile organic compounds (VOC) concerning the discharge of solvents. Especially the concern for this matter is positive in the fields of coating compositions and adhesive agents. In such applications, the curing agents are mostly used in situations where people are living. Accordingly, it is important that the curing agents scarcely smell, assure safety against a fire, explosion and the like and take only a short period until completion of operation. In this background, epoxy resin emulsions are increasingly used as a substitute, since the emulsions contain little or no volatile organic solvent, prevent environmental pollution, and are excellent in safety and hygiene and in preventive effect against fire hazards.

In preparing an epoxy resin emulsion, generally an epoxy resin is made hydrophilic with an emulsifier and is dispersed in an aqueous solvent. The epoxy resin emulsion, when used, is cured with a curing agent. Mostly conventional per se known curing agents for epoxy resin emulsions are made hydrophilic with an emulsifier and dispersed in an aqueous solvent. For this reason, the curing agent poses problems of reducing the curability, requiring a prolonged period of time in curing, and seriously degrading the properties of cured product.

Known as commercial aqueous products of epoxy resins are, for example, epoxy resin emulsions available under the trade name EPI-REZ series manufactured by Yuka Shell Epoxy Co., Ltd. Known curing agents include, for example, those available under the trade name Epicure series (polyamideamine adduct or the like) manufactured by Yuka Shell Epoxy Co., Ltd. However, the above- mentioned curing agents retard curing at room temperature and take a long period of time in curing.

An object of the present invention is to provide a curing agent for epoxy resins which can quickly cure the epoxy resin in a low temperature range and which imparts water resistance to a cured product in a short time, and an epoxy resin composition containing the curing agent.

Another object of the invention is to provide a curable epoxy resin emulsion composition which is quickly curable at room temperature.

DISCLOSURE OF THE INVENTION

The present invention provides a curing agent for epoxy resins, the curing agent containing as an active ingredient a compound represented by the formula (1) or a salt thereof and an amine compound or a salt thereof, the curing agent being characterized in that at least one of the compound represented by the formula (1) and the amine compound is a salt of thiocyanic acid:

$$NH_2N(R^1)(R^2) \qquad (1)$$

wherein $R^1$ and $R^2$ are the same or different and each represents alkyl having 1 to 8 carbon atoms, aryl, a nitrogen-containing heterocyclic group or when taken together, represents alkylene having 2 to 11 carbon atoms or a group represented by —$R^3$—$R^4$—$R^5$— wherein $R^3$ and $R^5$ are the same or different and each represents alkylene having 1 to 8 carbon atoms, and $R^4$ is an oxygen atom, a sulfur atom or a group =$NR^6$ or =$NNH_2$, wherein $R^6$ is a hydrogen atom or alkyl having 1 to 8 carbon atoms.

The present invention also provides an epoxy resin composition which comprises an epoxy resin and the curing agent for epoxy resins as defined in claim 1.

The present invention further provides an epoxy resin emulsion composition which comprises an epoxy resin emulsion and a compound represented by the formula (1) or a salt thereof.

The curing agent for epoxy resins according to the invention can quickly cure the epoxy resin at room temperature or in a lower temperature range, or even at a temperature as low as −20° C. although depending on the case. Consequently, for example, even if an epoxy resin adhesive agent for outdoor use is used in a construction work, the adhesive agent can be cured without heating by use of the curing agent for epoxy resins according to the invention, whereby great benefit is brought to the construction works. Further, construction work using an epoxy resin in cold climate can be easily and quickly performed by using the curing agent of the invention.

The curing agent for epoxy resins according to the present invention contains as an active ingredient a compound represented by the formula (1) or a salt thereof:

$$NH_2N(R^1)(R^2) \quad (1)$$

wherein $R^1$ and $R^2$ are the same or different and each represents alkyl having 1 to 8 carbon atoms, aryl, a nitrogen-containing heterocyclic group or when taken together, represents alkylene having 2 to 11 carbon atoms or a group represented by —$R^3$—$R^4$—$R^5$— wherein $R^3$ and $R^5$ are the same or different and each represents alkylene having 1 to 8 carbon atoms, and $R^4$ is an oxygen atom, a sulfur atom or a group =$NR^6$ or =$NNH_2$, wherein $R^6$ is a hydrogen atom or alkyl having 1 to 8 carbon atoms.

Examples of alkyl having 1 to 8 carbon atoms are methyl, ethyl, n-propyl, isopropyl, n-butyl, isobutyl, t-butyl, s-butyl, n-pentyl, isopentyl, t-pentyl, neopentyl, n-hexyl, isohexyl, heptyl, and octyl. Examples of alkylene having 2 to 11 carbon atoms are ethylene, propylene, butylene, hexylene, octylene, decamethylene, and undecamethylene. Examples of alkylene having 1 to 8 carbon atoms are methylene, ethylene, propylene, butylene, hexylene, and octylene. Examples of aryl are phenyl, tolyl, and naphthyl. Examples of nitrogen-containing heterocyclic group are pyridyl, piperidinyl, and pyrazolyl.

Specific examples of the compound represented by the formula (1) are 1-aminopyrrolidine (1-AP), 1-aminopiperidine, 1-aminohomorpiperidine (AHP), 1-aminopiperazine, N-amino-N'-methylpiperazine (AMPI), N-aminomorpholine (AMP), N-aminothiomorpholine, 1,1-dimethylhydrazine (UDMH), 1,1-diethylhydrazine, 1,1-dipropylhydrazine, 1,1-dibutylhydrazine, monomethylhydrazine, monoethylhydrazine, monopropylhydrazine, monoisopropylhydrazine, monobutylhydrazine, mono-tert-butylhydrazine, 1-ethyl-1-methylhydrazine, 1-methyl-1-propylhydrazine, 1-butyl-1-methylhydrazine, 1-methyl-1-phenylhydrazine, 1,1-diphenylhydrazine, monophenylhydrazine, and 2-hydrazinopyridine.

Among these compounds, especially preferred are those represented by the following formulas, namely 1-aminopyrrolidine (1-AP), 1-aminohomopiperidine (AHP), N-amino-N'-methylpiperazine (AMPI), and N-aminomorpholine (AMP):

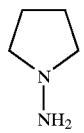
1-AP

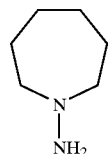
AHP

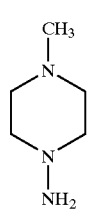
AMP I

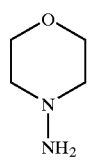
AMP

Salts of these compounds include, for example, thiocyanate, borate, hydrochloride, phosphate, and sulfate. Thiocyanate, if used, needs to be employed in combination with an amine compound or a salt thereof to be described later.

The compound of the formula (1) or a salt thereof to be used in the present invention can be used as it is, or in the form of powder, liquid, an aqueous solution, an organic solvent solution, or a dispersion. Examples of useful organic solvents are lower alcohols such as methanol, ethanol and isopropanol; aromatic hydrocarbons such as toluene and xylene; aliphatic hydrocarbons such as hexane; ethers; polar solvents; and halogenated hydrocarbons. Optionally a solution or a dispersion of the compound in water or in a proper organic solvent may be used.

Examples of the amine compound which is used as at least one of the compound of the formula (1) or a salt thereof and the amine compound or a salt thereof which is a salt of thiocyanic acid are alkylamine, linear aliphatic amine, cyclic amine, aromatic amine, aliphatic aromatic amine, epoxy-modified products thereof, Mannich modified products thereof, and Michael modified addition products thereof.

Useful alkylamines include, for example, compounds represented by the formula $NH_2(R^7)$ (wherein $R^7$ is a straight chain or branched chain alkyl having 1 to 12 carbon atoms) such as methylamine, ethylamine, propylamine, isopropylamine, butylamine, sec-butylamine, t-butylamine, n-octylamine, and 2-ethylhexylamine; compounds represented by the formula $NH(R^8)(R^9)$ (wherein $R^8$ and $R^9$ are the same or different and each represents a straight chain or branched chain alkyl having 1 to 12 carbon atoms) such as dimethylamine, diethylamine, dipropylamine, diisopropylamine, dibutylamine, di-sec-butylamine, di-t-butylamine, di-n-octylamine, and di-2-ethylhexylamine; compounds represented by the formula $N(R^{10})(R^{11})(R^{12})$ (wherein $R^{10}$, $R^{11}$ and $R^{12}$ are the same or different and each represents a straight chain or branched chain alkyl having 1 to 12 carbon atoms) such as trimethylamine, tripropylamine, triisopropylamine, tributylamine, tri-sec-butylamine, tri-t-butylamine, and tri-n-octylamine.

Examples of linear aliphatic amines are compounds represented by the formula $(R^{13})$ $(R^{14})N(CH_2)nN(R^{15})$ $(R^{16})$ (wherein $R^{13}$, $R^{14}$, $R^{15}$, and $R^{16}$ are the same or different and each represents a hydrogen atom, or straight chain or branched chain alkyl having 1 to 6 carbon atoms and n is a number from 1 to 5) such as 3-(dimethylamino) propylamine, 3-(diethylamino)-propylamine, 3-(methylamino) propylamine, 3-(dibutylamino) propylamine, and tetramethyl-ethylenediamine; compounds represented by the formula $N(R^{17})$ $(R^{18})$ $(CH_2)nNH_2$ (wherein $R^{17}$ and $R^{18}$ are the same or different and each represents a hydrogen atom, or straight chain or branched chain alkyl having 1 to 6 carbon atoms and n is a number from 1 to 5) such as ethylenediamine; compounds represented by the formula $N(R^{19})$ $[(CH_2)nNH_2])_2$ (wherein $R^{19}$ is a hydrogen atom, or straight chain or branched chain alkyl having 1 to 6 carbon atoms and n is a number from 1 to 5) such as 3,3'-iminobis(propylamine) and N-methyl-3,3'-iminobis(propylamine); compounds represented by the formula $N[(CH_2)nNH_2]_3$ (wherein n is a number from 1 to 5) such as tris(2-aminoethyl)amine; compounds represented by the formula $NH_2(CH_2)m[(CH_2)nNH]xNH_2$ (wherein m, n and x represent a number from 1 to 5) such as diethylenetriamine, triethylenetetramine, tetraethylenepentamine, and other linear aliphatic amines such as 3-(2-ethylhexyloxy)propylamine, 3-ethoxypropylamine, 3-methoxypropylamine, allylamine, diallylamine, triallylamine, polyoxypropylenediamine, and polyoxypropylenetriamine.

Examples of cyclic amines are bis(4-amino-3-methyldicyclohexyl) methane, diaminodicyclohexylmethane, bis(aminomethyl) cyclohexane, N-aminoethylpyrazine, 3,9-bis(3-aminopropyl) -2,4,8,10-tetraoxaspiro(5,5)undecane, m-xylenediamine, isophoronediamine, menthenediamine, 1,4-bis(2-amino-2-methylpropyl) piperazine, N,N'-dimethylpiperazine, pyridine, picoline, 1,8-diazabicyclo[5, 4,0]-7-undecene, benzylmethylamine, 2,4,6-tris (dimethylaminomethyl)phenol, 2-(dimethylaminomethyl)-phenol, 2-methylimidazole, and 2-ethyl-4-methylimidazole.

Examples of aromatic amines are metaphenylenediamine, diaminodiphenylmethane, diaminodiphenylsulfine, diaminodiethyldimethyl diphenylmethane, and α, α',-bis(4-aminophenyl) -p-diisopropylbenzene.

Examples of aliphatic aromatic amines are α-(m/p-aminophenyl) ethylamine and the like.

Examples of salts of these amine compounds are thiocyanate, borate, hydrochloride, phosphate, and sulfate. Among them, preferred specific examples of thiocyanates are diethylenetriamine thiocyanate (DATA.SCN), 2,4,6-tris (dimethylaminomethyl)phenol thiocyanate (DMP-30.SCN), 1,8-diazabicyclo[5.4.0]-7-undecene thiocyanate (DBU.SCN), m-xylenediamine thiocyanate (MXDA.SCN), and isophoronediamine thiocyanate (IPDA SCN).

The compound represented by the formula (1) or a salt thereof and the amine compound and a salt thereof, at least one of which is a salt of thiocyanic acid in the curing agent, can be used as a mixture, or can be used in the form of an aqueous solution, an organic solvent solution or a dispersion. Examples of useful organic solvents are lower alcohols such as methanol, ethanol and isopropanol; aromatic hydrocarbons such as toluene and xylene; aliphatic hydrocarbons such as hexane; ethers; polar solvents; and halogenated hydrocarbons. Optionally a solution or a dispersion of the compound in water and in a proper organic solvent may be used. Among these, an aqueous solution is particularly preferable.

The compound represented by the formula (1) or a salt thereof and the amine compound and a salt thereof in the curing agent are used in a molar ratio of the former to the latter of, e.g. from approximately 1:10 to 10:1.

Of the active ingredients in the curing agent for epoxy resins as defined in claim 1, at least one of the compound represented by the formula (1) and the amine compound is essentially a salt of thiocyanic acid.

The curing agent for epoxy resins as defined in claim 1 can quickly cure the epoxy resin when used in the presence of water. When the curing agent is used in the presence of water, water is used preferably in a molar ratio of water: compound of the formula (1) of from 0.8:1 to 1.2:1.

The curing agent in which at least one of the compound represented by the formula (1) or a salt thereof and the amine compound or a salt thereof is a salt of thiocyanic acid can quickly cure the epoxy resin even at room temperature and can impart improved water resistance and toughness to the cured epoxy resin when used as a curing agent for epoxy resin emulsion.

Epoxy resin which can be used in the invention is not specifically limited, and various epoxy resins are usable. Examples thereof are glycidyl ether type epoxy resin, glycidyl ester resin and glycidylamine type epoxy resin.

Examples of glycidyl ether type epoxy resin are bisphenol A type, bisphenol F type, brominated bisphenol A type, hydrogenated bisphenol A type, bisphenol S type, bisphenol AF type, biphenyl type, naphthalene type, fluorene type, phenol novolac type, cresol novolac type, DPP novolac type, trifunctional type, tris(hydroxyphenyl)methane type, and tetraphenylolethane type epoxy resins.

Examples of glycidyl ester type epoxy resin are hexahydrophthalate type and phthalate type epoxy resins.

Examples of glycidylamine type epoxy resin are tetraglycidyldiaminodiphenylmethane, triglycidyl isocyanurate, hydantoin type, 1,3-bis (N,N-diglycidylaminomethyl) cyclohexane, aminophenol type, aniline type, and toluidine type epoxy resins.

The epoxy resin emulsion composition of the present invention comprises (i) an epoxy resin which is made hydrophilic with an emulsifier such as a surfactant, and is thereby dispersed in an aqueous solvent; and (ii) the compound of the formula (1) or a salt thereof as a curing agent for epoxy resins. The curing agent for epoxy resins according to the invention contains the compound represented by the formula (1) or a salt thereof and the amine compound or a salt thereof in which at least one of the compound represented by the formula (1) and the amine compound is a salt of thiocyanic acid.

The epoxy resin emulsion composition of the present invention containing an epoxy resin at a high concentration exhibits a lower degree of increase in viscosity than when an organic solvent is used. Consequently, the above-mentioned composition is easy to apply in a coating operation. Further the foregoing composition, because of an aqueous solvent used, can adhere well to a wet substrate surface, and may contain a hydraulic material (such as gypsum and Portland cement) as a filler. The composition which contains little or no organic solvent is usable in a closed tank or chamber and is excellent in preventive effect against environmental pollution. With such outstanding features, the composition can be widely used for coating compositions or adhesive materials.

The most remarkable features of the composition according to the invention are that it can overcome the defect of conventional epoxy resin emulsions in respect of the curing rate, and that it can cure the epoxy resin quickly or in a short time, of course, at a high temperature and at room temperature or lower, e.g. at a temperature as low as 5° C. Especially when the curing agent to be used contains the compound of the formula (1) or a salt thereof and the amine compound and a salt thereof in which at least one of the compound of the formula (1) and the amine compound is a salt of thiocyanic acid, surprisingly the cured product is imparted high water resistance and good mechanical properties such as film strength which conventional epoxy resin emulsions disadvangeously lack.

Emulsifiers useful in the invention are not specifically limited and include various emulsifying agents. Examples of anionic emulsifiers are sodium lauryl sulfate and like sulfuric acid ester salts of higher alcohols, alkylbenzene sulfonate, alkylnaphthalene sulfonate, dialkylsulfosuccinic acid salt, and polyoxyethylene ether sulfate. Examples of nonionic emulsifiers are polyoxyethylene alkyl ether, polyoxyethylene alkylphenol ether, polyoxyethylene sorbitan fatty acid ester, sorbitan fatty acid ester, polyoxyethylene acyl ester, oxyethylene-oxypropylene block copolymer, and fatty acid monoglyceride. These anionic and nonionic emulsifiers can each be used singly or in mixture of at least two of them.

It is desirable to carry out a phase inversion emulsification method in producing an epoxy resin emulsion. First, a small amount of water is mixed with an emulsifier-containing oil component (epoxy resin-containing organic solvent) to give a W/O type emulsion. Then, small amounts of water are gradually added to bring about phase inversion, eventually giving an O/W type emulsion.

Mixing devices include, for example, an axis-type agitators having rotating blades, homogenizers, homomixers, and colloid mills. An emulsification temperature is in the range of, preferably 10 to 80° C., more preferably 30 to 50° C.

There is no specific limitation on the average particle size of particles in the epoxy resin emulsion. Usually the particle size thereof is about 0.01 to about 10 $\mu$m, preferably about 0.1 to about 1 $\mu$m. If the average particle size of particles exceeds 10 $\mu$m, precipitation is likely to occur, resulting in instability.

The amount of the emulsifier used is preferably 100 parts by weight or less, more preferably 5 to 20 parts by weight, per 100 parts by weight of the epoxy resin.

Specific examples of the epoxy resin emulsion include EPI-REZ aqueous epoxy resin series manufactured by Yuka Shell Co., Ltd. such as 3510W60, 3515W60, 3519W50, 3520WY55, 3540WY55, 3551WY43, 5522WY55, and 6006W70. Also available are ADEKA RESIN aqueous epoxy resin series manufactured by Asahi Denka Kogyo Co., Ltd- such as EM-0512, EM-0517, and EM-101-50. These epoxy resin emulsions can be used either alone or in combination.

The epoxy resin emulsion composition of the present invention contains the compound of the formula (1) or a salt thereof as the curing agent for epoxy resins. Further, the compound of the formula (1) or a salt thereof and the amine compound and a salt thereof in which at least one of the compound of the formula (1) and the amine compound is a salt of thiocyanic acid can be used as the curing agent.

The curing agent of the invention is soluble in water, and therefore eliminates the need to make the epoxy resin hydrophilic with an emulsifier such as a surfactant. Consequently the curing agent is excellent in workability and the cured product thus obtained is scarcely degraded in properties due to the emulsifier and is excellent in water resistance and film strength especially when used in a coating composition.

The proportions of the curing agent of the invention and the epoxy resin or epoxy resin emulsion (solid content) are not specifically limited and are selectable from a wide range depending on the type of the epoxy resin, type and amount of other additives used, purpose of the cured epoxy resin, curing conditions (predetermined curing time, curing temperature, curing location and the like). Usually the proportions are so determined that the equivalent ratio of epoxy group/amine group ranges from about 0.5 to about 2, preferably from about 0.7 to about 1.2 in which case the calculation of equivalent ratio is made between the epoxy group in the epoxy resin and the total of amine groups in the compound of the formula (1) and in the amine compound.

The epoxy resin or epoxy resin emulsion composition according to the invention may contain a conventional curing agent and a conventional curing accelerator within the range which does not adversely affect their preferred properties. Examples of the curing agent which can be added are diethylenetriamine, triethylenetetramine, isophoronediamine, diaminodiphenylmethane, diaminodiphenylsulfone, polyamide, dicyandiamide, hexahydrophthalic anhydride, methylnadic anhydride, novolak phenolic resin, tertiary amines, imidazoles, boron trifluoride and like amine complexes, melamine, methylolmelamine, and resol compounds. Examples of the curing accelerator are tri-n-butylamine, benzylmethylamine, 2,4,6-tris (dimethylaminomethyl)phenol and like tertiary amines, 2-methylimidazoles, 2-ethylimidazoles, 2-ethyl-4-methylimidazole, 2-phenylimidazole, and like imidazoles. These curing agents and curing accelerators can be used either alone or in combination.

To epoxy resin or epoxy emulsion composition can be added, as required, a filler and reinforcing agent, which have conventionally been added to epoxy resin. Examples of fillers are silica, fused quartz, calcium carbonate, barium carbonate, barium sulfate, alumina hydrate, alumina, magnesia hydrate, zircon, cordierite, silicon nitride, boron nitride, and aluminum nitride. Examples of reinforcing agents are talc, mica, glass fiber, potassium titanate fiber, titanium dioxide fiber, wallastonite, xonotlite, zinc silicate fiber, aramide fiber, carbon fiber and boron fiber. It is possible to suitably change the kind, amount or the like of a filler and reinforcing agent in order to obtain desired properties of a cured epoxy resin product. Usually, it is suitable to add about 20 to 160 parts by weight of a filler and reinforcing agent, preferably about 50 to 120 parts by weight, based on 100 parts by weight of epoxy resin. Filler and reinforcing agent may be used singly or in a combination of at least two of them.

Further, various additives may be added as required to the above epoxy resin or epoxy emulsion composition. Examples of such additives are pigment (particulate titanium dioxide, carbon black, red iron oxide, yellow iron oxide, etc.), viscosity adjusting agent, leveling agent, antifoamer, coupling agent, plasticizer, diluent, flame retardant (magnesium hydroxide, aluminum hydroxide, antimony oxide, alkyl phosphates or phosphazenes), and organic solvent.

The epoxy resin composition of the invention is applicable to coat, bond, or repair materials such as metal, synthetic resin, cement, ceramics, knitting or fabric of inorganic or organic fiber (glass cross, etc.) and papers, or to prepare a shaped product using the composition. Specifically, an article of various shape may be dipped in the epoxy resin composition, alternatively, the epoxy resin composition is applied or coated to the article surface, or poured into the article or filled into opening between articles, and then allowed to stand as it is, for curing. When curing, heating is not required particularly, but it is possible to heat to about 40 to 120° C. as required depending on the composition.

Also, the above epoxy resin composition can be formed into a shaped product of a desired shape, in accordance with the usual molding method, e.g., casting molding and injection molding.

BEST MODE OF CARRYING OUT THE INVENTION

The present invention is described below in more detail with reference to the following examples to which, however, the invention is not limited at all.

EXAMPLES 1 to 5

To 10 g of an epoxy resin (Epikote 806, product of Yuka Shell Epoxy Co., Ltd., epoxy equivalent 165) were added 0.94 g of a 83% aqueous solution of 1-aminopyrrolidine (curing agent), and 0.82 g of each compound (additive) shown in Table 1. Then, the three substances were mixed. The mixture was placed into an aluminum cup 5 cm in diameter to a thickness of 1 cm and was aged for 24 hours.

In 24 hours, the obtained cured product was subjected to a 24-hour water absorption test to measure an absorption ratio. The results are shown in Table 1. In the procedure, the addition, mixing, curing and absorption test were all carried out at 5° C.

Comparative Example 1

A test was conducted in the same manner as in Example 1 except that a thiocyanate of amine compound was not added. The results are shown in Table 1.

Comparative Examples 2 and 3

A test was conducted in the same manner as in Example 1 except that sodium thiocyanate or ammonium thiocyanate was used as an additive. The results are shown in Table 1.

EXAMPLES 6 and 7

To 10 g of an epoxy resin (Epikote 806, epoxy equivalent 165) were added 1.3 of 1-aminopyrrolidine thiocyanate (AP·SCN, curing agent), and 0.7 g of each compound (additive) shown in Table 2. Then, the three substances were mixed. The mixture was placed into an aluminum cup 5 cm in diameter to a thickness of 1 cm and was aged for 24 hours.

In 24 hours, the obtained cured product was subjected to a 24-hour water absorption test to measure an absorption ratio. The results are shown in Table 2.

Comparative Example 4

A test was conducted in the same manner as in Example 2 except that an additive was not added. The results are shown in Table 2.

TABLE 1

| | | Amount (g) | | | | Water |
|---|---|---|---|---|---|---|
| | Additive | Epikote 806 | curing agent | Additive | Cure state after 24 hr | absorption ratio (%) |
| Ex. 1 | DETA · SCN | 10 | 0.94 | 0.82 | cure | 0.4 |
| Ex. 2 | DMP-30 · SCN | 10 | 0.94 | 0.82 | cure | 0.7 |
| Ex. 3 | DBU · SCN | 10 | 0.94 | 0.82 | cure | 0.5 |
| Ex. 4 | MXDA · SCN | 10 | 0.94 | 0.82 | cure | 0.4 |
| Ex. 5 | IPDA · SCN | 10 | 0.94 | 0.82 | cure | 0.4 |
| Com. Ex. 1 | — | 10 | 0.94 | 0 | cure | 1.7 |
| Com. Ex. 2 | Sodium thiocyanate | 10 | 0.94 | 0.82 | non-cure | — |
| Com. Ex. 3 | Ammonium thiocyanate | 10 | 0.94 | 0.82 | non-cure | — |

TABLE 2

| | | Amount (g) | | | | Water |
|---|---|---|---|---|---|---|
| | Additive | Epikote 806 | AP · SCN | Additive | Cure state after 24 hr | absorption ratio (%) |
| Ex. 6 | DETA | 10 | 1.3 | 0.7 | cure | 0.3 |
| Ex. 7 | MXDA | 10 | 1.3 | 0.7 | cure | 0.2 |
| Com. Ex. 4 | — | 10 | 1.3 | 0.7 | non-cure | — |

EXAMPLES 8 and 9

A bisphenol A epoxy resin emulsion shown in Table 3 and a 83% aqueous solution of 1-aminopyrrolidine (1-AP) were used in an equivalent ratio of amine group/epoxy group of 0.2. The two substances were mixed together and applied to a steel plate (0.8 mm in thickness) to a thickness of 0.3 mm to produce a test piece.

A test for the curing rate was conducted at room temperature (20° C.) according to JIS K 5400. The results are shown in Table 3. The term "drying to the touch" indicates a period of time taken until the coating composition did not adhere to the finger when touched by the finger. The term "dry hard" indicates a period of time taken until a finger print was not left on the coating film when the finger was pressed on the coating film. "EPI-REZ 3520 WY55" (hereinafter referred to as "EP-1"):

Manufactured by Yuka Shell Epoxy Co., Ltd., bisphenol A type epoxy resin emulsion, solid content 55%, epoxy equivalent 520 "EPI-REZ 5522 WY55" (hereinafter referred to as "EP-2"):

Manufactured by Yuka Shell Epoxy Co., Ltd., modified polyfunctional bisphenol A type epoxy resin emulsion, solid content 53%, epoxy equivalent 625

TABLE 3

| | epoxy resin emulsion (wt. parts) | | Curing agent (wt. parts) | drying to the touch (hr) | dry hard (hr) |
|---|---|---|---|---|---|
| | EP-1 | EP-2 | 1-AP | | |
| Ex. 8 | 100 | | 1.7 | 2 | 9 |
| Ex. 9 | | 100 | 1.4 | 2 | 9 |

EXAMPLES 10 and 11

The same procedures as in Examples 8 and 9 were effected except that a 94% aqueous solution of 1-aminopyrrolidine and m-xylenediamine thiocyanate (MXDA.SCN) were used as the curing agent in an equivalent ratio of amine group/epoxy group of 0.9. The results are shown in Table 4. 1-AP and MXDA.SCN were used in an equal molar ratio.

Comparative Examples 5 and 6

The same procedures as in Examples 8 and 9 were conducted except that an amideamine curing agent (manufactured by Yuka Shell Epoxy Co., Ltd., trade name "Epicure 8536MY60", solid content 60%, amine value 120 mgKOH/g, hereinafter called "EH-11") was used in a molar ratio of amine group/epoxy group of 1.0. The results are shown in Table 4.

In respect of Examples 10 and 11 and Comparative Examples 5 and 6, the test pieces were aged at room temperature (20° C.) for a week according to JIS K5400, and then were subjected to a water resistance test and to a falling ball test.

TABLE 4

| | epoxy resin emulsion (wt. parts) | | curing agent (wt. parts) | | |
|---|---|---|---|---|---|
| | EP-1 | EP-2 | 1-AP + MXDA · SCN | EH-1 | |
| Ex. 10 | 100 | | 4.9 | | |
| Ex. 11 | | 100 | 4.9 | | |
| Com. Ex. 5 | 100 | | | 82.1 | |
| Com. Ex. 6 | | 100 | | 68.3 | |

| | water resistance | | | Falling ball test (1.5 m) | drying to the touch (hr) | dry hard (hr) |
|---|---|---|---|---|---|---|
| | turn white | swell | peel | | | |
| Ex. 10 | ○ | ○ | ○ | ○ | 2 | 6.5 |
| Ex. 11 | ○ | ○ | ○ | ○ | 2 | 6.5 |
| Com. Ex. 5 | × | ○ | ○ | × | 6.5 | 26 |
| Com. Ex. 6 | × | ○ | ○ | × | 6.5 | 26 |

The amounts of the epoxy resin emulsions and the amounts of the curing agents in Tables 3 and 4 are all expressed in part by weight.

Industrial Applicability

According to the present invention, there can be obtained a curing agent for epoxy resins which can quickly cure the epoxy resin in a low temperature range and can give improved water resistance to the cured product in a short time.

The curing agent for epoxy resins according to the invention can quickly cure the epoxy resin at room temperature or in a lower temperature range, or even at a temperature as low as −20° C. although depending on the case. Consequently, for example, even if an epoxy resin adhesive agent for outdoor use is used in a construction work, the adhesive agent can be cured without heating by use of the curing agent for epoxy resins according to the invention, whereby great benefit is brought to the construction works. Further, construction works using an epoxy resin in cold climate can be easily and quickly carried out.

According to the invention, there can be obtained a curable epoxy resin emulsion composition which contains little or no volatile organic solvent, effectively prevents environmental pollution, and is outstanding in safety and hygiene and in preventive effect against fire hazards.

The epoxy resin emulsion composition of the invention can quickly cure the epoxy resin even at room temperature with or without heating and provides the cured product with excellent properties.

What is claimed is:

1. A curing agent for epoxy resins, the curing agent containing as an active ingredient a compound represented by the formula (1) or a salt thereof and an amine compound or a salt thereof, the curing agent being characterized in that at least one of the compound represented by the formula (1) and the amine compound is a salt of thiocyanic acid:

$$NH_2N(R^1)(R^2) \tag{1}$$

wherein $R^1$ and $R^2$ are the same or different and each represents alkyl having 1 to 8 carbon atoms, aryl, a nitrogen-containing heterocyclic group or when taken together, represents alkylene having 2 to 11 carbon atoms or a group represented by $-R^3-R^4-R^5-$ wherein $R^3$ and $R^5$ are the same or different and each represents alkylene having 1 to 8 carbon atoms, and $R^4$ is an oxygen atom, a sulfur atom or a group $=NR^6$ or $=NNH_2$, wherein $R^6$ is a hydrogen atom or alkyl having 1 to 8 carbon atoms.

2. A curing agent for epoxy resins as defined in claim 1 wherein the compound represented by the formula (1) is 1-aminopyrrolidine.

3. An epoxy resin composition which comprises an epoxy resin and the curing agent for epoxy resin of claim 1.

4. An epoxy resin emulsion composition which a comprises an epoxy resin emulsion and the curing agent for epoxy resins of claim 1.

5. An epoxy resin emulsion composition which comprises an epoxy resin emulsion and the compound represented by the formula (1) or a salt thereof.

6. An epoxy resin composition which comprises an epoxy resin and the curing agent for epoxy resin of claim 2.

7. An epoxy resin emulsion composition which comprises an epoxy resin emulsion and the curing agent for epoxy resins of claim 2.

* * * * *

UNITED STATES PATENT AND TRADEMARK OFFICE
CERTIFICATE OF CORRECTION

PATENT NO.     : 6,503,967 B1
DATED          : January 7, 2003
INVENTOR(S)    : Takashi Kitajima et al.

It is certified that error appears in the above-identified patent and that said Letters Patent is hereby corrected as shown below:

<u>Title page,</u>
Item [73], Assignee, "Otsuka Nagaku Kabushiki Kaisha" should read -- Otsuka Kagaku Kabushiki Kaisha --.

Signed and Sealed this

Sixth Day of May, 2003

JAMES E. ROGAN
*Director of the United States Patent and Trademark Office*